United States Patent
Yang et al.

(10) Patent No.: US 8,334,870 B2
(45) Date of Patent: Dec. 18, 2012

(54) METHODS FOR OBTAINING A THREE-BAND INTRINSIC IMAGE FROM A SINGLE INPUT IMAGE

(75) Inventors: Qingxiong Yang, Mountain View, CA (US); Kar-Han Tan, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 733 days.

(21) Appl. No.: 12/384,229

(22) Filed: Apr. 2, 2009

(65) Prior Publication Data

US 2010/0253684 A1 Oct. 7, 2010

(51) Int. Cl.
*G06T 15/00* (2006.01)
(52) U.S. Cl. ........ 345/426; 345/419; 345/428; 348/571; 382/103
(58) Field of Classification Search ............... 345/419, 345/426, 428; 348/571; 382/103
See application file for complete search history.

(56) References Cited

U.S. PATENT DOCUMENTS 7,457,436 B2 * 11/2008 Paragios et al. ............... 382/103
2011/0043699 A1 * 2/2011 Springett et al. .............. 348/571

OTHER PUBLICATIONS

Alvarez et al, Illuminant-Invariant Model-Based Road Segmentation, The Computer Vision center, University Autonoma de Barcelona, 2008, pp. 1-6.*
Yang et al, Illumination-Invariant Color Space and its Application to skin-color detection; Optical Engineering 49(10), Oct. 2010, pp. 1-10.*
Finlayson et al, On the Removal of Shadows from images, IEEE Trans. Pattern Anal. Machine Intelligent, 28(1), pp. 59-68, 2006.*

* cited by examiner

*Primary Examiner* — Phu K Nguyen (57) ABSTRACT

Various embodiments of the present invention related to methods for obtaining shadow invariant and shadow-shading invariant images from a single camera image taken with a narrow-band camera sensor and assuming Plankian illuminating conditions.

18 Claims, 8 Drawing Sheets

METHODS FOR OBTAINING A THREE-BAND INTRINSIC IMAGE FROM A SINGLE INPUT IMAGE

TECHNICAL FIELD

Various embodiments of the present invention relate to methods for decomposing a single input image into intrinsic images.

BACKGROUND

Figure 1A:
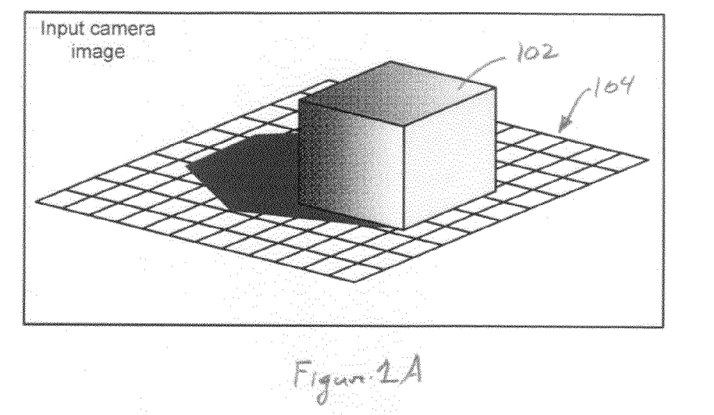
FIGS. 1A-1C show decomposition of an image into two intrinsic images.

Illumination conditions cause problems for many computer vision algorithms. In particular, variations in color or intensity of the illumination of a scene captured by a camera can cause problems for algorithms that segment, track, or recognize objects in a captured input image of the scene. For example, consider an input image of a box 102 disposed on a surface of grid lines 104 shown in FIG. 1A. The input image can be a digital image captured by a camera. Because the box 102 is illuminated from one direction, the shading on the box 102 opposite the illuminating direction is nearly indistinguishable from the shadow cast by the box 102 on the surface 104. The dark surface region of the box 102 and the shadow cast by the box 102 onto the surface 104 make the tasks of identifying the box 102 a challenge for image recognition algorithms or segmenting the image of the box 102 from the image of the surface 104 a challenge for many segmentation algorithms.

Figure 1B:
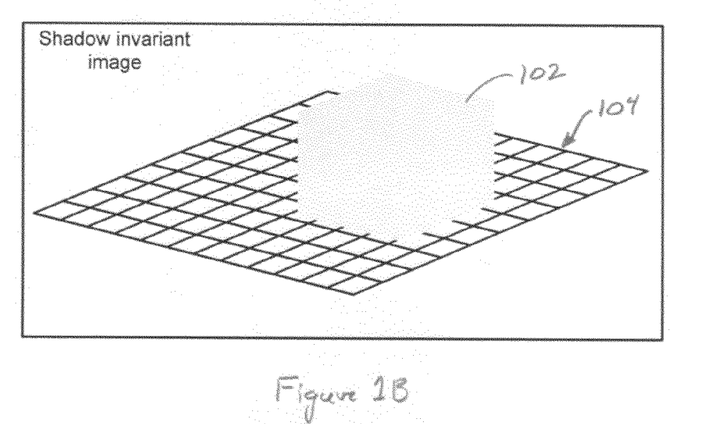
Figure 1C:
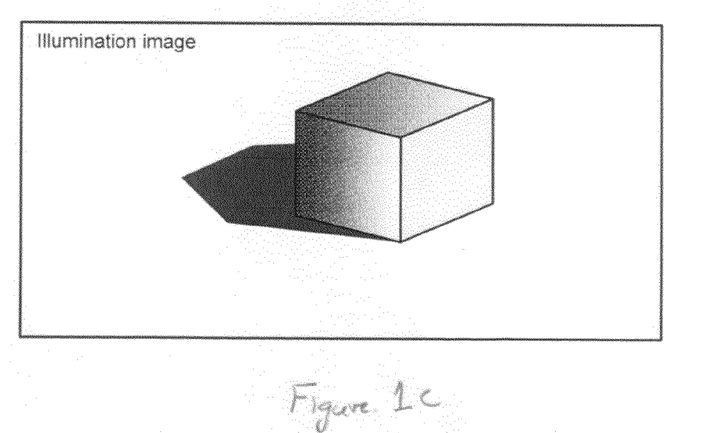

In order to alleviate the difficulties of image segmenting, recognition, or object tracking, a input image can be ideally decomposed into two intrinsic images called an illumination image and a shadow invariant image. FIGS. 1B and 1C show a decomposition of the input image shown in FIG. 1A into a shadow invariant image and an illumination image, respectively. The shadow invariant image shows the box 102 and the surface 104 with the shadow observed in FIG. 1A removed. In other words, a shadow invariant image is independent of the illumination conditions. On the other hand, the illumination image shows only the shadows cast by the box 102 created by illuminating the box from one direction. Decomposing an image into the intrinsic images can be useful for supporting a range of visual inferences. For example, a typical segmentation algorithm would likely correctly segment the box 102 as a single segment using the shadow invariant image shown in FIG. 1B.

In recent years, a number of different techniques have been developed for decomposing a input image into intrinsic images and in particular to obtaining the shadow invariant image of a input image. Certain techniques derive a shadow invariant image of a scene from a sequence of images of the scene under a range of illumination conditions. However, obtaining multiple images of a scene under various illumination conditions can be time intensive and is not always practical. Other techniques use a single input image but require human interaction or user assisted methods to perform reflection and shadow separation. These methods can produce good results with careful user assistance, but are time and labor intensive. Other techniques that use a single image but without user assistance are learning based approaches that separate reflectance edges and illumination edges in a derivative image. Although these methods can separate reflectance and shading for a given illumination direction, these methods have difficulty classifying edges under arbitrary lighting conditions. In still other techniques, by assuming a Lambertian surface and using a three-band camera sensor (i.e., red, green, and blue bands), a one-dimensional grayscale image that is invariant to shadow and shading can be obtained. However, these techniques transform a red, green, and blue ("RGB") based image into a one-dimensional grayscale representation which reduces the distinction between surfaces. These techniques have been extended to derive a two-dimensional image using a four-band camera, which eliminates the Lambertian assumption, and theoretically has been proven to generate three-dimensional invariant images that can be recovered with six-band cameras. However, four- and six-band cameras are rarely ever used.

Thus, recovering color shadow invariant images from a single input image of a three-band camera remains a challenging problem for computer vision systems.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Various embodiments of the present invention are directed to methods for determining a shadow invariant, three-dimensional color intrinsic image from a single RGB image and obtaining a shadow-shading invariant, two-dimensional image from a single RGB image. In the following description of method embodiments, a linear relationship between the color of a shadow invariant image and the color of the RGB input image are derived and extended for shading reduction.

I. Illumination and Reflection Model

Methods of present invention assume that a spectral power distribution ("SPD") provides an adequate representation of an illumination spectrum of a scene and follows Plank's law:

$$E(\lambda, T) = \frac{2\pi hc^2}{\lambda^5} \frac{1}{\exp\left(\frac{hc}{\lambda kT}\right) - 1}$$

where
   h is Plank's constant;
   c is the speed of light in a vacuum;
   k is Boltzmann's constant;
   T is the color temperature; and
   $\lambda$ is the wavelength of light.

The SPD provides an approximation of the basic physical information about the light illuminating the scene and serves as a starting point for quantitative analyses of color. For example, the SPD can approximate the spectrum of sun light striking surfaces of objects in a scene or approximate the spectrum of light emanating from one or more incandescent light sources. For illuminations in the temperature range of about 2500 K to about 10000 K (reddish through whitish to bluish), the term:

$$\exp\left(\frac{hc}{\lambda kT}\right) \gg 1$$

and Wien's approximation can be used to obtain an approximation to the SPD given by:

$$E(\lambda, T) = \frac{2\pi hc^2}{\lambda^5} \exp\left(-\frac{hc}{\lambda kT}\right)$$

Figure 2A:
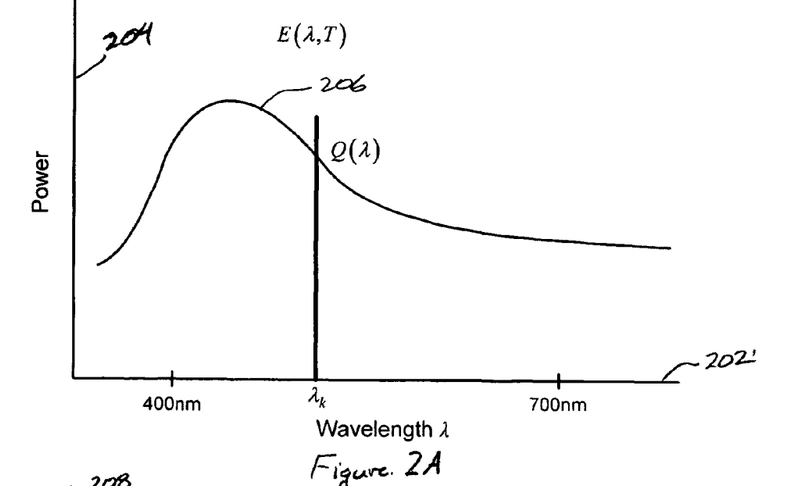
FIG. 2A shows a plot of a spectral power distribution in accordance with embodiments of the present invention.

FIG. 2A shows a plot of an SPD $E(\lambda,T)$ over the visible spectrum of wavelengths for a particular temperature T. In FIG. 2A, axis 202 corresponds to the visible range of wavelengths, axis 204 corresponds to optical power, and curve 206 represents an SPD $E(\lambda,T)$ of the visible spectrum at the temperature T.

For the surface reflection model of a scene captured as an input image, methods of the present invention employ a dichromatic model for describing the reflected light. The dichromatic model is based on the assumption that the light reflected from an object is a combination of diffuse light and specular light. In other words, the intensity of each pixel of a input image is treated independently, in the same manner, and is represented by the pixel intensity equation:

$$I = I_{Diff} + I_{Spec}$$

where
   $I_{Diff} = \rho_d \int_\lambda E(\lambda,T) S(\lambda) Q(\lambda) d\lambda$ is the intensity associated with the diffusion portion of the pixel intensity;
   $I_{Spec} = \rho_s \int_\lambda E(\lambda,T) Q(\lambda) d\lambda$ is the intensity associated with the specular portion of the pixel intensity;
   $\rho_d$ and $\rho_s$ are geometric factors associated with diffuse and specular reflection of each pixel;
   $S(\lambda)$ is a surface reflectance spectrum ("SRS"); and
   $Q(\lambda)$ is a sensor element response.

Figure 2B:
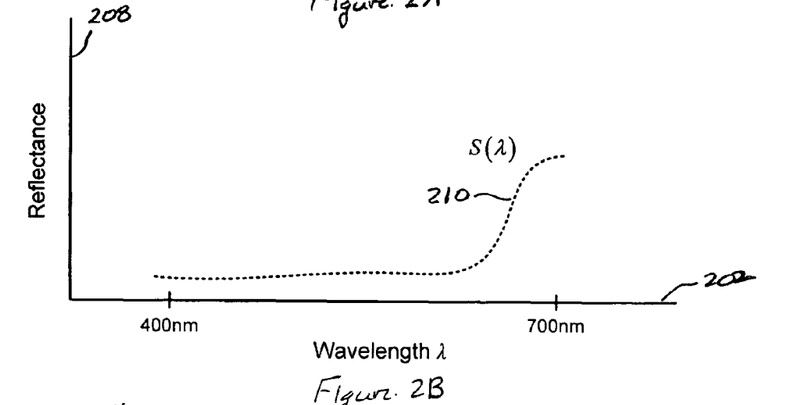
FIG. 2B shows a plot of a surface reflectance spectrum of an object in accordance with embodiments of the present invention.

Because the geometry of a scene can vary from pixel to pixel, the values of $\rho_d$ and $\rho_s$ can vary from pixel to pixel. The SRS $S(\lambda)$ represents reflectance of light from an object over a range of wavelengths. FIG. 2B represents an example of an SRS of an object in accordance with embodiments of the present invention. In FIG. 2B, axis 208 represents reflectance and curve 210 is an exemplary representation of an SRS $S(\lambda)$ for an object reflecting light primarily in the red wavelength portion of the visible spectrum.

The reflectance of an object is influenced by the range of illuminating wavelengths. For example, the color spectrum of light reflected from an object illuminated under interior lighting appears different than the color spectrum of light reflected from the same object illuminated under sun light, and the SPD associated with interior light is different from the SPD associated with sun light. The reflectance of the object illuminated under the light conditions characterized by the SPD $E(\lambda,T)$ 206 and having the surface reflectance spectrum SRS $S(\lambda)$ 210 is characterized by the product $E(\lambda,T)S(\lambda)$ and is represented by curve 212 shown in FIG. 2C.

The image recording device includes a sensor composed of an image sensor overlaid with a color filter array ("CFA"), such as Bayer filter. The image sensor comprises an array of neighboring sensor elements and the light reaching each sensor element passes through a red, green, or blue color filter of the CFA. The CFA may comprise alternating red and green filters for odd rows and alternating green and blue filters for even rows, with twice as many green filters as red or blue filters. The wavelengths $\lambda_r$, $\lambda_g$, and $\lambda_b$ represent the red, green, and blue wavelengths or RGB bands detected by sensor elements of the sensor and are the primary colors used to reconstruct pixels of a single digital input image of a scene captured by the image recording device. In other embodiments, other color models can be used requiring three or more color values per pixel, such as yellow, cyan, and magenta. A single sensor element cannot simultaneously record these three intensities. Thus, the CFA can be used to selectively filter a particular color for each pixel.

For an RGB image recording device, $Q(\lambda)$ denotes the response of a sensor element associated with each of RGB bands. Mathematically, a sensor element response can be characterized by:

$$Q_u(\lambda) = q_u \delta(\lambda - \lambda_u)$$

where
   $u \in \{r, g, b\}$;
   $q_u$ is the magnitude of the sensor response associated with the pixel; and
   $\delta(\lambda - \lambda_u)$ is the Dirac delta function.

Figure 2C:
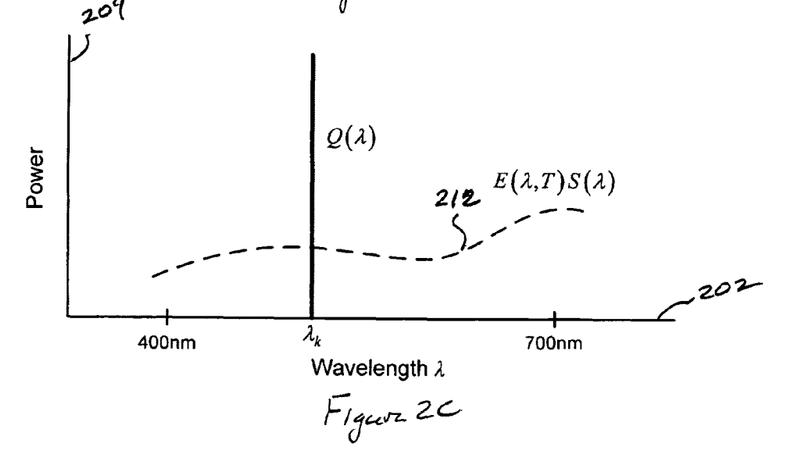
FIG. 2C shows a plot of the product of the spectral power distribution and the surface reflectance spectrum shown in FIGS. 2A and 2B, respectively, in accordance with embodiments of the present invention.

The sensor response $Q(\lambda)$ associated with each wavelength can be a voltage created by light of one of the three bands reaching a particular sensor element. The magnitude of a sensor element response $q_u$ corresponds to the intensity of the wavelength of light reaching a sensor element and is used to estimate the color level for a corresponding pixel of the input image. An example of a sensor response $Q(\lambda)$ is represented in FIGS. 2A and 2C by lines 214 and 216 for a particular wavelength $\lambda_k$.

A demosaicing algorithm can be used to interpolate color information into a full color image image data based on the raw voltage data obtained from the image sensor. Demosaicing is part of the processing pipeline that renders the raw image data into a viewable format and is well-known in the art. The result of demosaicing is a full color digital input image comprising pixels. Each pixel is the smallest unit of information in an image, and each pixel typically comprises three primary color bands, such as red, green, and blue of varying intensity. By varying the intensity the three colors red, green, blue, each pixel is capable of displaying a full range of colors. Demosaicing can be implemented in firmware in the image recording device or in software in a raw converter program that converts the raw voltage data obtained from the image sensor into RGB color values associated with each pixel of the full color image.

Integrating the diffuse and specular intensity terms of the pixel intensity for a particular RGB band u gives:

$$I_u = \rho_d E(\lambda_u, T) S(\lambda_u) q_u + \rho_s E(\lambda_u, T) q_u$$

Substituting the Wien approximation for the SPD gives:

$$I_u = (\rho_d S(\lambda_u) + \rho_s) q_u \frac{2hc^2}{\lambda_u^5} \exp\left(-\frac{hc}{\lambda_u k T}\right)$$

In other words, $I_u$ represents the pixel intensity of the RGB band u.

Figure 3:
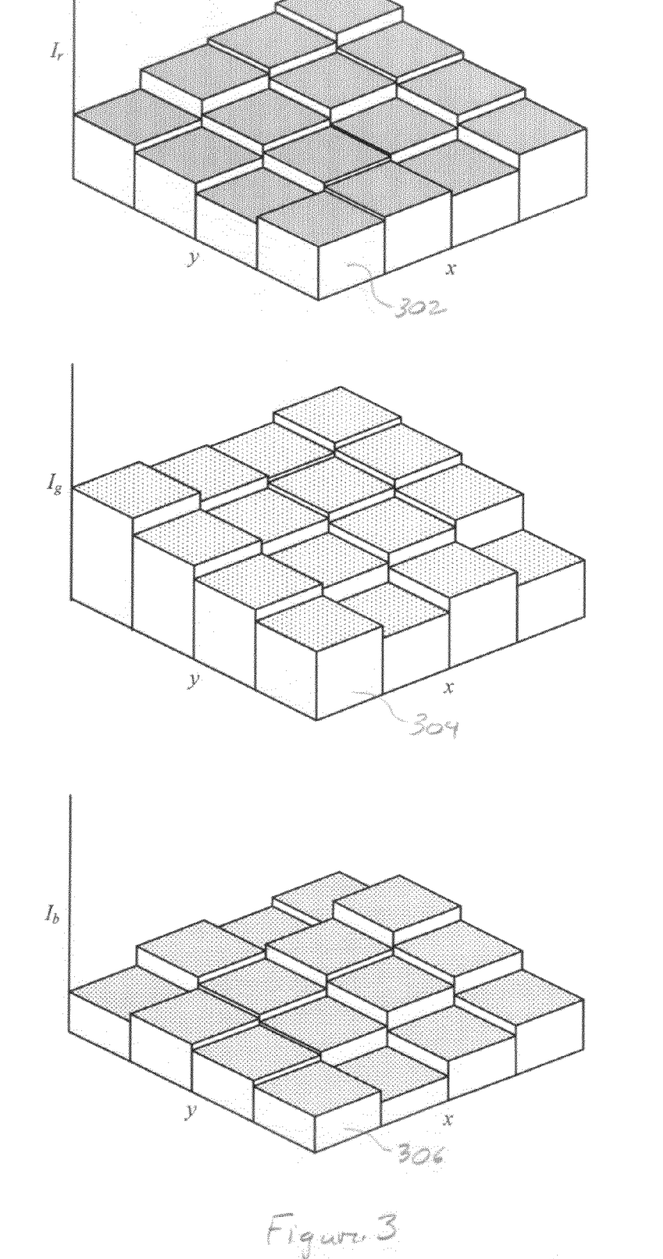
FIG. 3 shows a conceptual representation of red, green and blue intensities of 16 pixels of a digital input image in accordance with embodiments of the present invention.

The intensities $I_r$, $I_g$, and $I_b$ for each pixel can be individually varied to create an array of colors for each pixel. FIG. 3 shows a conceptual representation of RGB intensities $I_r$, $I_g$, and $I_b$ associated with a 4×4 grid of 16 pixels of a digital input image in accordance with embodiments of the present invention. Each pixel is represented by a cuboid and the height of each pixel above the xy-plane corresponds to a level of the intensity $I_u$. For example, a color exhibited by one of the 16 pixels comprises a red pixel intensity component 302, a green pixel intensity component 304, and a blue pixel intensity component 306. A combination of intensities displayed simultaneously produces a pixel of a particular color.

The color associated with a pixel can be stored in a memory device as an RGB triplet (r,g,b), where each color band can vary from zero to a defined maximum value. When all the bands are at zero the resulting color of the pixel is black. By contrast, when all of the bands of a pixel are at the maximum value, each of the RGB bands of the pixel is at full intensity and the resulting color of the pixel is the brightest representable white.

The ranges for each band may be quantified in several different ways and stored as a numerical value. For example, a color band can range from "0" to "1," with "0" corresponding to no color represented, "1" corresponding to the full color band intensity, and any fractional value in between. This reprentation can be used in systems that use floating-point representations for color band intensities. In computing, 256 intensities associated with each color band can be stored as an integer ranging from "0" to "255," which is the range offered by a single 8-bit byte. For example, the RGB triplets (255,0, 255) and (255,255,0) represent magenta and yellow pixels, respectively. For relatively higher-end digital imaging systems, the integer range 0 to 65,535 can be used for each color band, which is the range a single 16-bit word can represent.

II. Computing Device

The image recording device can be, but is not limited to, a digital camera, a mobile phone or camera phone, a personal digital assistant, a camcorder or any device that digitally captures images via an electronic image sensor and can store the image data in memory, such as flash memory or any other storage medium. The image recording device can include a video output port or a wireless medium enabling the image recording device to establish communication with a computing device so that digital images stored in memory of the image recording device can be uploaded to the computing device for image processing as described below in subsections III-VI. The computing device can be any device that allows a user to receive digital images uploaded from the image recording device and is capable of presenting a user interface on a display screen, including, but not limited to: a desktop computer, a laptop computer, a portable computer, a display system, a television, a computer monitor, a navigation system, a portable media player, a personal digital assistant, a game console, a handheld electronic device, an embedded electronic device, or an appliance.

Figure 4:
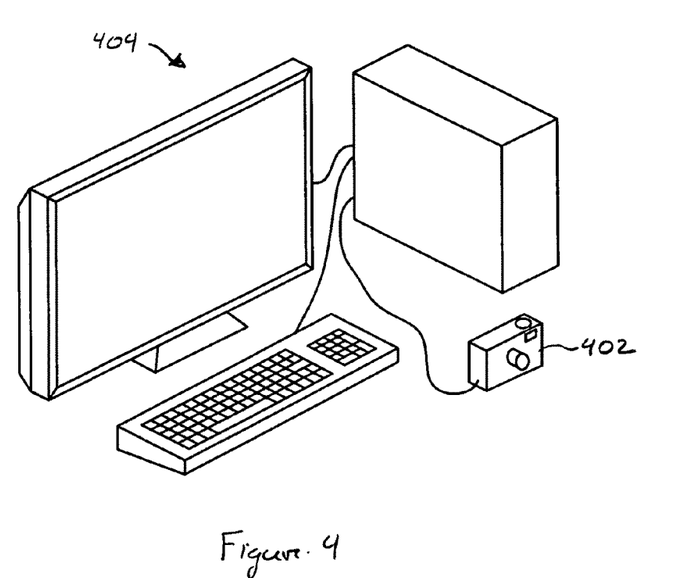
FIG. 4 shows an example of a digital camera electronically coupled to a desktop computer in accordance with embodiments of the present invention.

FIG. 4 shows an example of a digital camera 402 electronically coupled to a desktop computer 404 in accordance with embodiments of the present invention. The desktop computer 404 and the camera 402 can include applications that enable digital images stored in the camera 402 memory to be uploaded to the desktop computer 404 for image processing.

Figure 5:
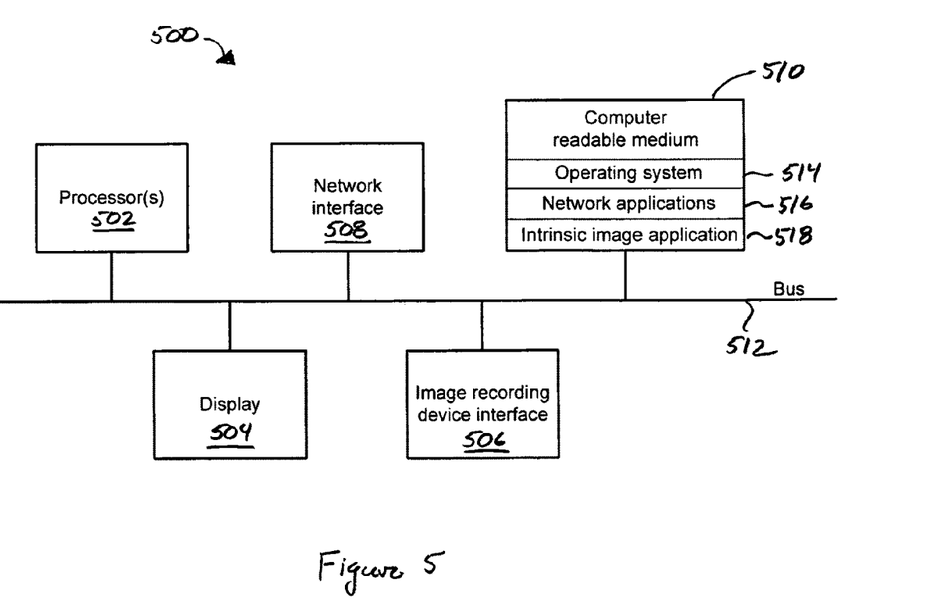
FIG. 5 shows a schematic representation of a computing device configured in accordance with embodiments of the present invention.

FIG. 5 shows a schematic representation of a computing device 500 configured in accordance with embodiments of the present invention. The system 500 includes one or more processors 502, such as a central processing unit; one or more display devices 504, such as a monitor; a camera interface 506; one or more network interfaces 508, such as a USB port, an Ethernet, or FireWire port; one or more computer-readable mediums 510. Each of these components is operatively coupled to one or more buses 512. For example, the bus 512 can be an EISA, a PCI, a USB, a FireWire, a NuBus, or a PDS.

The computer readable medium 510 can be any medium that participates in providing instructions to the processor 502 for execution and storage of image data. For example, the computer readable medium 510 can be non-volatile media, such as an optical or a magnetic disk; volatile media, such as memory; and transmission media, such as coaxial cables, copper wire, and fiber optics. Transmission media can also take the form of acoustic, light, or radio frequency waves.

The computer-readable medium 510 also includes an operating system 514, such as Mac OS, Windows, Unix, and Linux; a network communications module 516; and an intrinsic image application 518. The operating system 514 can be multi-user, multiprocessing, multitasking, multithreading, real-time and the like. The operating system 514 can also perform basic tasks such as recognizing input from input devices, such as a keyboard or a keypad; sending output to the display 504; keeping track of files and directories on medium 510; controlling peripheral devices, such as disk drives, printers, image recording device 506; and managing traffic on the one or more buses 512. The network applications 516 includes various components for establishing and maintaining network connections, such as software for implementing communication protocols including TCP/IP, HTTP, Ethernet, USB, and FireWire. The computer readable medium 510 can also store other software applications, including word processors, browsers, e-mail, Instant Messaging, and media players.

The intrinsic image application 518 provides various software components for enabling the creation of intrinsic images, as described below in subsections III-VI. In certain embodiments, some or all of the processes performed by the application 518 can be integrated into the operating system 514. In certain embodiments, the processes can be at least partially implemented in digital electronic circuitry, or in computer hardware, firmware, software, or in any combination thereof.

III. Shadow Reduction

The shadow component of the pixel intensity $I_u$ is assumed to be characterized by a temperature dependent term. Hence, obtaining an expression for the shadow invariant component reduces to isolating the parameter T. In order to isolate the temperature dependent term of $I_u$, the natural logarithm of the pixel intensity $I_u$ produces the following expression:

$$L_u = \log(I_u) = \log\left[(\rho_d S(\lambda_u) + \rho_s) q_u \frac{2hc^2}{\lambda_u^5}\right] + \left(-\frac{hc}{\lambda_u kT}\right) \quad \text{Equation (1)}$$

The temperature T is isolated in a term of the right-hand side of $L_u$, and the temperature invariant portion of $L_u$ is given by the term:

$$W_u = \log\left[(\rho_d S(\lambda_u) + \rho_s) q_u \frac{2hc^2}{\lambda_u^5}\right] \quad \text{Equation (2)}$$

In other words, $W_u$ is the shadow invariant term, which can be computed from $$W_u = L_u + \frac{hc}{\lambda_u kT} \quad \text{Equation (3)}$$

Denoting $$W'_u = W_u \frac{\lambda_u k}{hc} \quad \text{Equation (4)}$$

and $$L'_u = L_u \frac{\lambda k}{hc} \quad \text{Equation (5)}$$

gives a second expression for the shadow invariant term as follows:

$$W'_u = L'_u + \frac{1}{T} \quad \text{Equation (6)}$$

As described above, the wavelength $\lambda_u$ is a property of the image recording device that is known or can be calibrated as described below in subsection V. Thus, the shadow invariant computation problem is reduced to solving for the parameter T.

$W_u$ and $W'_u$ both represent a shadow invariant intensity of a pixel for a color band u. The fraction of the color band u present in the shadow invariant image $W'_u$ is given by:

$$w_u = \frac{W'_u}{\sum_{i \in \{r,g,b\}} W'_i} \quad \text{Equation (7)}$$

and the fraction of the color band u present in the logarithm image $L'_u$ is given by:

$$l_u = \frac{L'_u}{\sum_{i \in \{r,g,b\}} L'_i} \quad \text{Equation (8)}$$

Substituting equations (7) and (8) for $W'_u$ and $L'_u$ in equation (6) gives:

$$w_u \sum_{i \in \{r,g,b\}} W'_i = l_u \sum_{i \in \{r,g,b\}} L'_i + \frac{1}{T} \quad \text{Equation (9)}$$

Summing over every $u \in \{r,g,b\}$ gives:

$$\sum_{i \in \{r,g,b\}} W'_i = \sum_{i \in \{r,g,b\}} L'_i + \frac{3}{T} \quad \text{Equation (10)}$$

Substituting equation (10) into equation (9) and solving for T gives:

$$T = \frac{1 - 3w_u}{w_u \sum_{i \in \{r,g,b\}} L'_i - L'_u} \quad \text{Equation (11)}$$

Setting u equal to m, where $$m = \underset{u \in \{r,g,b\}}{\arg\max} L_u$$

and substituting equation (11) into equations (6) and (3) gives expressions for the shadow invariant terms as functions of the logarithm image as follows:

$$W'_u = L'_u + \frac{w_m \sum_{i \in \{r,g,b\}} L'_i - L'_m}{1 - 3w_m} \quad \text{Equation (12)}$$

and $$W_u = L_u + \frac{hc}{\lambda_u k} \frac{w_m \sum_{i \in \{r,g,b\}} L'_i - L'_m}{1 - 3w_m} \quad \text{Equation (13)}$$

In general, $w_m$ is different for each pixel. However, when $w_m$ is set equal to a constant $\kappa$, where $\kappa \neq \frac{1}{3}$, a three-dimensional image that is invariant to shadows can be computed for each pixel as follows:

$$P_u = L_u + \frac{hc}{\lambda_u k} \frac{\kappa \sum_{i \in \{r,g,b\}} L'_i - L'_m}{1 - 3\kappa} \quad \text{Equation (14)}$$

$$= L_u + \frac{\kappa \sum_{i \in \{r,g,b\}} \frac{\lambda_i}{\lambda_u} L_i - \frac{\lambda_m}{\lambda_u} L_m}{1 - 3\kappa}$$

$P_u$ is the shadow invariant intensity of a color band u associated with a pixel. Each shadow invariant pixel has a triplet of shadow invariant intensities ($P_r$, $P_g$, $P_b$). Thus, a full color shadow invariant image can be obtained and displayed by computing $P_u$ for each band of each pixel of an input image.

The relationship between $P_u$ and $W_u$ is summarized in Theorems 1 and 2 as follows:

Theorem 1: For any two pixels x and y, if $W_u(x) = W_u(y)$, then $P_u(x) = P_u(y)$.

Theorem 2: For any two pixels x and y, if $P_u(x) = P_u(y)$, then $W_u(x) = W_u(y)$ or the color difference of $W_u(x)$ and $W_u(y)$ is neutral. In other words, $$\frac{W_u(x) - W_u(y)}{\sum_{i \in \{r,g,b\}} (W_i(x) - W_i(y))} = \frac{1}{3}$$

Proofs of Theorems 1 and 2 are provided in an APPENDIX.

IV. Shading Reduction

The method of subsection III can be further extended to remove both shadow and shading from a digital input image. From equations (10), (11), and (12), each pixel of a two-dimensional intrinsic image that is invariant to shadows and shading is computed by:

$$w_u = \frac{L'_u + \dfrac{w_m \sum_{i \in \{r,g,b\}} L'_i - L'_m}{1 - 3w_m}}{\sum_{i \in \{r,g,b\}} L'_u + 3\dfrac{w_m \sum_{i \in \{r,g,b\}} L'_i - L'_m}{1 - 3w_m}} \quad \text{Equation (15)}$$

$$= \frac{L'_u - L'_m + w_m \left( \sum_{i \in \{r,g,b\}} L'_i - 3L'_u \right)}{\sum_{i \in \{r,g,b\}} L'_i - 3L'_m}$$

Again, substituting the constant $\kappa$ for $w_m$, transforms equation (14) into a shadow-shading invariant image:

$$p_u = \frac{L'_u - L'_m + \kappa \left( \sum_{i \in \{r,g,b\}} L'_i - 3L'_u \right)}{\sum_{i \in \{r,g,b\}} L'_i - 3L'_m} \quad \text{Equation (16)}$$

$$= \frac{L_u - \dfrac{\lambda_m}{\lambda_u} L_m + \kappa \left( \sum_{i \in \{r,g,b\}} \left(\dfrac{\lambda_i}{\lambda_u} L_i\right) - 3L_u \right)}{\sum_{i \in \{r,g,b\}} \left(\dfrac{\lambda_i}{\lambda_u} L_i\right) - \dfrac{3\lambda_m}{\lambda_u} L_m}$$

Note that $p_m = \kappa$ is constant, $p_u$ is actually a two-band image. $p_u$ is the intensity of a color band u associated with a pixel. Each shadow invariant pixel has a triplet of shadow invariant intensities $(p_r, p_g, p_b)$. Thus, a shadow-shading invariant image can be obtained by computing $p_u$ for each band of each pixel of an input image.

The relationship between $p_u$ and $w_u$ is summarized as follows in Theorem 3 and 4.

Theorem 3: For any two pixels x and y, if $w_u(x) = w_u(y)$, then $p_u(x) = p_u(y)$.

Theorem 4: For any two pixels x and y, if $p_u(x) = p_u(y)$, then $w_u(x) = w_u(y)$ or $w_u(x)$ is linear to $w_u(y)$, that is $w_u(x) = Aw_u(y) + B$, where $$A = \frac{1 - 3w_u(x)}{1 - 3w_u(y)} \text{ and } B = \frac{w_u(x) - w_u(y)}{1 - 3w_u(y)}$$

Proofs of Theorems 3 and 4 are provided in the APPENDIX.

V. Image Recording Device Calibration

According to the shadow invariant equation $P_u$ and the shadow-shading invariant equation $p_u$, computation of the shadow and shadow-shading invariant image requires knowledge of the relative wavelengths of the light passing through the image sensor as follows:

$$\lambda'_u = \frac{\lambda_u}{\sum_{i \in \{r,g,b\}} \lambda_i}$$

Figure 6A:
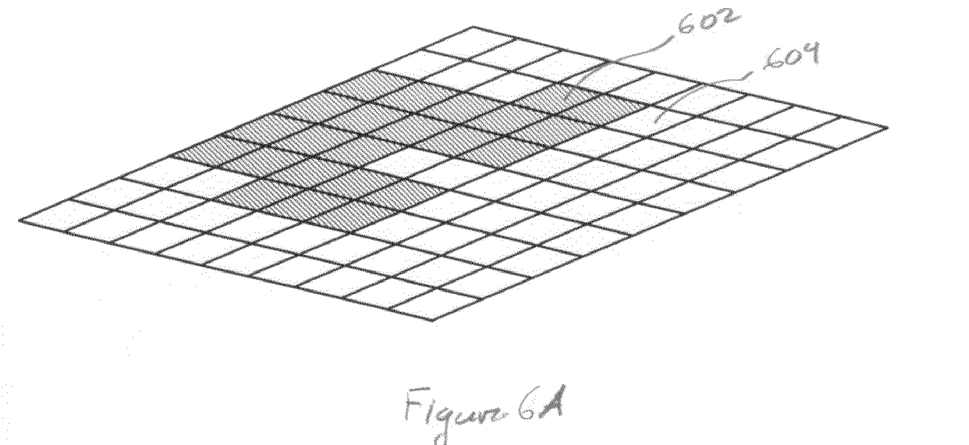
FIG. 6A shows shadow and non-shadow pixels associated with a portion of an input image in accordance with embodiments of the present invention.

FIG. 6A shows shadow and non-shadow pixels associated with a portion of an input image having a uniform color distribution in accordance with embodiments of the present invention. In FIG. 6A, shadow pixels are identified by shading, such as pixel 602, and non-shadow pixels are not shaded, such as pixel 604. Assuming x denotes a shadow pixel and y denotes a non-shadow pixel, according to equation (1), the relative wavelengths for the RGB bands are given by:

$$\lambda'_u = \frac{1/(L_u(x) - L_u(y))}{\sum_{i \in \{r,g,b\}} 1/(L_i(x) - L_i(y))} \quad \text{Equation (17)}$$

Figure 6B:
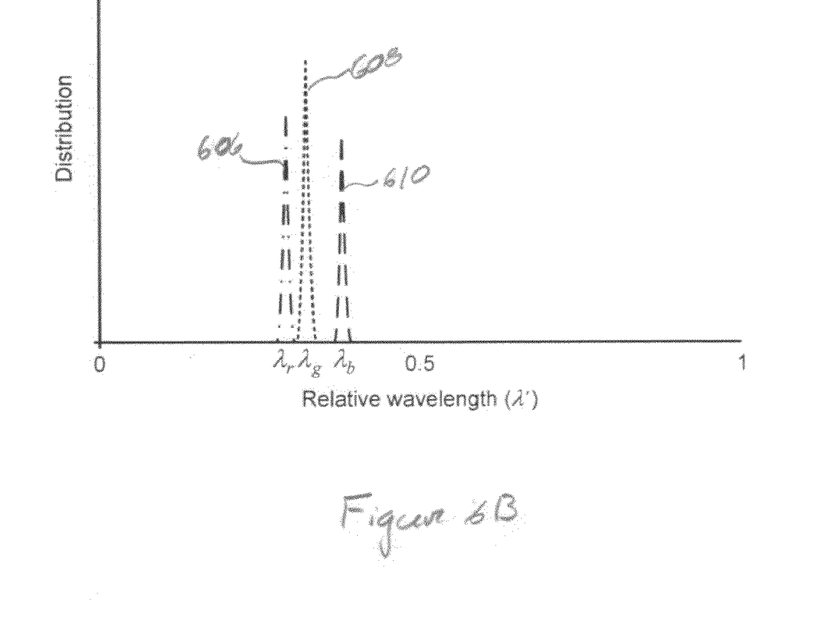
FIG. 6B shows an exemplary plot of red, green, and blue relative wavelength distributions obtained in accordance with embodiments of the present invention.

The relative wavelength $\lambda'_u$ is computed for each shadow and non-shadow pixel pair x and y. FIG. 6B shows an exemplary plot of red, green, and blue relative wavelength distributions represented by distribution curves 606, 608, and 610, respectively. The wavelengths $\lambda_r$, $\lambda_g$, and $\lambda_b$ are associated with each peak of the distribution curves 606, 608, and 610 and serve as the calibration wavelengths for the image recording device.

Figure 7A:
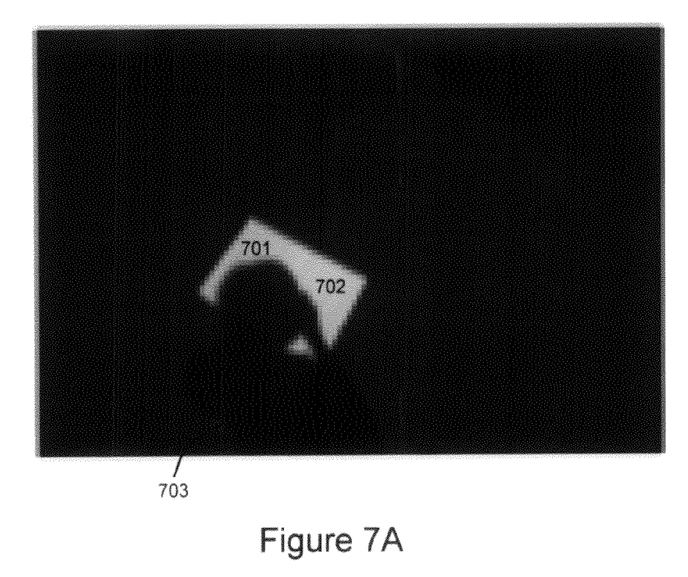
FIGS. 7A-7B show portions of an input image used to calibrate an image recording device in accordance with embodiments of the present invention.
Figure 7B:
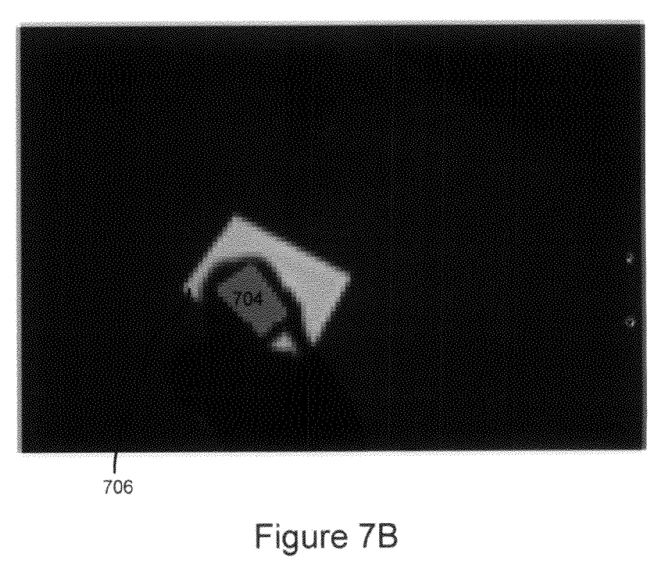

Calibration of an image recording device can be performed manually. A user captures a digital image of scene and displays the image of the scene on a display device such as a monitor. The user then identifies a portion of the input image having a uniform color distribution. FIGS. 7A-7B show portions of an input image with a region having uniform color distribution that can be used to calibrate an image recording device in accordance with embodiments of the present invention. In FIG. 7A, the input image includes a region having a uniform color distribution created by three adjacent sheets of paper 701-703 disposed on a sidewalk. The input image is taken in daylight conditions so that portions of the sheets of paper also fall within a shadow of the photographer of the input image. The resulting input image shown in FIG. 7A has regions of the paper that fall within and outside the shadow of the photographer and both regions have substantially uniform color distributions. In FIG. 7B, a trapezoid-shaped region 704 identifies shadow pixels and a region 706 identifies non-shadow pixels that can be used to calibrate the image recording device using equation 16. Once the image recording device has been calibrated, no further calibration of the image recording device is performed. Input images can then be collected and shadow invariant and shadow-shading invariant images of the input images can be determined in accordance with equations (14) and (16), respectively.

VI. Shadow Invariant and Shadow-Shading Invariant Implementations

Figure 8:
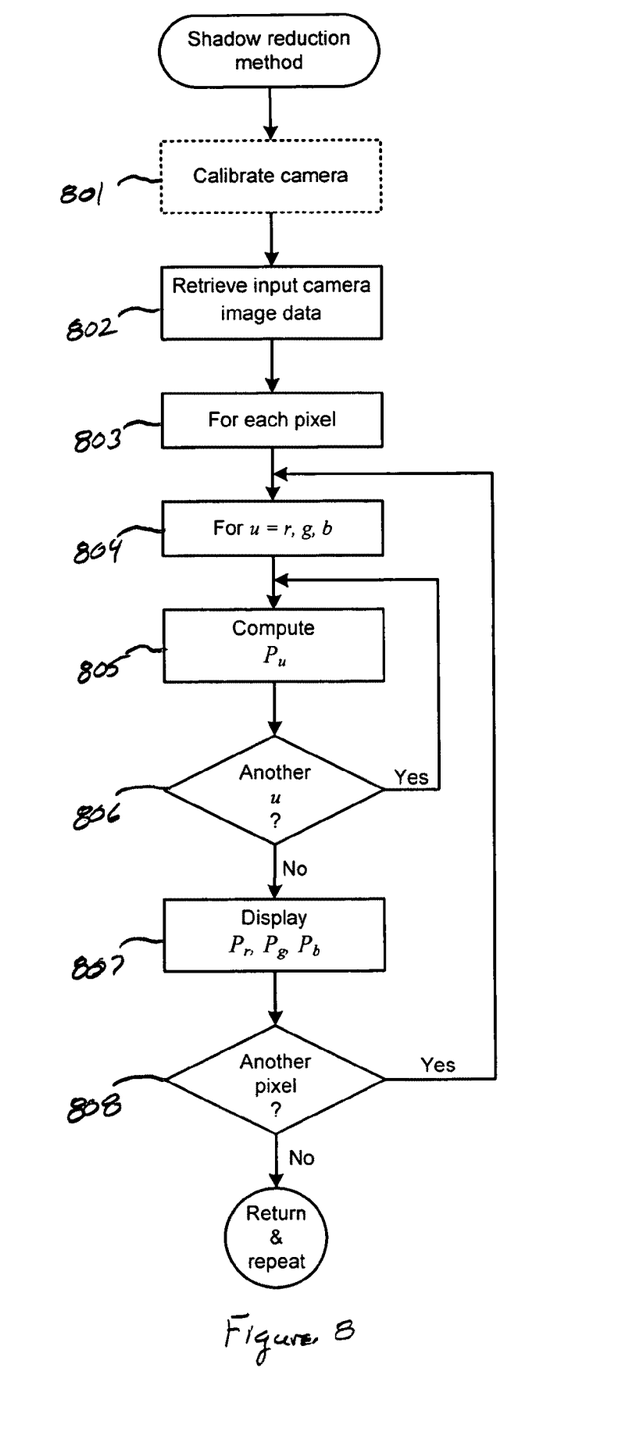
FIG. 8 shows a control-flow diagram of a method for generating a shadow invariant image from an input image in accordance with embodiments of the present invention.

FIG. 8 shows a control-flow diagram of a method for generating a shadow invariant image from an input image in accordance with embodiments of the present invention. In optional step 801, an image recording device used to capture input images is calibrated by determining relative wavelengths $\lambda'_u$, as described above with reference to equation 17. The relative wavelengths serve as the calibration wavelengths for the image recording device. Step 801 is performed before input images are taken and processed in accordance with steps 802-808. Once the RGB wavelengths for the image recording device are determined, step 801 does not have to be performed for subsequent input images, unless input images are taken with a different image recording device. In step 802, the input image comprises pixel data that is retrieved from memory. In the for-loop of step 803, steps 804-808 are repeated for each pixel. In the for-loop of step 804, steps 805-806 are repeated for each primary color band. In step 805, $P_u$ is computed in accordance with equation (14). In step 806, repeat step 805 for a different band, otherwise proceed to step 807. In step 807, the three shadow invariant intensities $P_r$, $P_g$, and $P_b$ associated with a pixel are displayed on a display device, such as monitor. In step 808, repeat steps 804-807 for another pixel, otherwise, proceed to step 809. In step 809, steps 802-808 are repeated for a subsequent input image.

Note that the method shown in FIG. 8 can be modified to compute the shadow-shading invariant image of the input image by modifying step 805 such that the shadow-shading invariant $p_u$ is computed for each of the primary color bands and step 807 displays each of the shadow-shading invariant intensities $p_r$, $p_g$, and $p_b$.

Figure 9A:
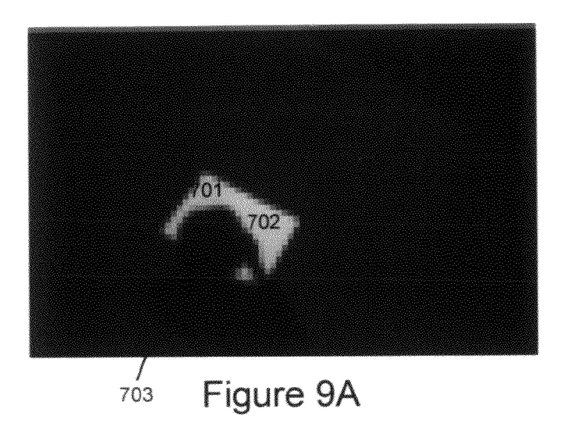
FIGS. 9A-9C show shadow invariant and shadow-shading invariant images obtained in accordance with embodiments of the present invention.
Figure 9B:
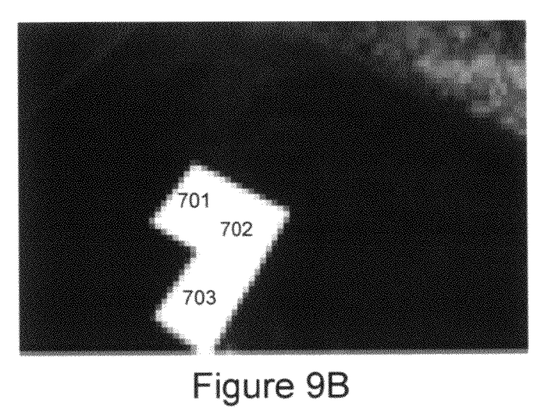
Figure 9C:
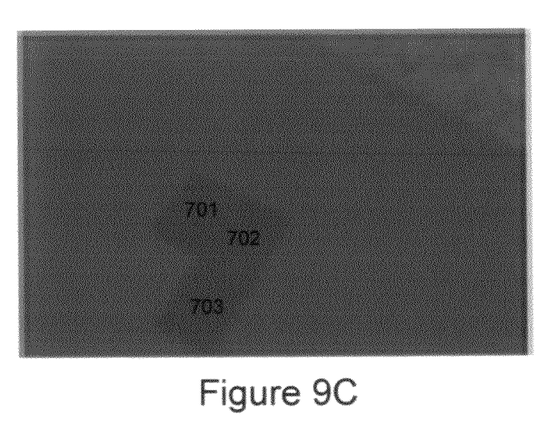

FIGS. 9A-9C show shadow invariant and shadow-shading invariant images obtained for the same input image in accordance with embodiments of the present invention. FIG. 9A shows the same input image used to perform image recording device calibration as described above with reference to FIG. 7A. FIG. 9B shows a shadow invariant image of the input image shown in 9A. FIG. 9B reveals that the shadow of the photographer displayed in FIG. 9A is removed from the image displayed in FIG. 9B. The shadow invariant image displayed in FIG. 9B is obtained by applying equation (14) to each pixel of the input image shown in FIG. 9A, as described above with reference to FIG. 8. Shading variations in the surface of the sidewalk on which the three sheets of paper are disposed are visible in FIG. 9B. FIG. 9C shows a shadow-shading invariant image of the input image shown in FIG. 9A. FIG. 9C reveals that the shadow of the photographer displayed in FIG. 9A and the shading in the sidewalk displayed in FIGS. 9A and 9B are removed from the shadow-shading invariant image displayed in FIG. 9C. The shadow-shading invariant image displayed in FIG. 9C is obtained by applying equation (16) to each pixel of the input image shown in FIG. 9A, as described above with reference to FIG. 6.

Note that although FIGS. 9A-9C are displayed as black and white photographs, in practice, the actual images obtained are full color images. In other words, in practice, a shadow invariant image and a shadow-shading invariant image obtained using Equations (14) and (16), respectively, are full color images.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

APPENDIX

Theorem 1: For any two pixels x and y, if $W_u(x)=W_u(y)$, then $P_u(x)=P_u(y)$.

Proof: Assume $W_u(x)=W_u(y)$, then $$W'_u(x)=W'_u(y) \qquad \text{Equation (18):}$$

$$w_m(x)=w_m(y) \qquad \text{Equation (19):}$$

Assuming $L_u = \Sigma_{i \in \{r,g,b\}} L'_i$, from equations (12), (18), and (19) gives:

$$L'_u(x) + \frac{w_m(x)L'_s(x) - L'_m(x)}{1 - 3w_m(x)} = L'_u(y) + \frac{w_m(x)L'_s(y) - L'_m(y)}{1 - 3w_m(x)}$$

which implies that $$L'_u(x) - L'_m(x) - L'_u(y) + L'_m(y) = w_m(x)(L'_s(y) - 3L'_u(y) - L'_s(x) + 3L'_u(x)) \qquad \text{Equation (20):}$$

From (6) and (18)

$$L'_u(x) - L'_m(x) - L'_u(y) + L'_m(y) = 0 \qquad \text{Equation (21):}$$

For chromatic pixels, $w_m(x) \neq 0$, thus substitutes (21) and (20), we have $$L'_s(y) - 3L'_u(y) - L'_s(x) + 3L'_u(x) = 0 \qquad \text{Equation (22):}$$

From equations (21) and (22):

$$((L'_u(x) - L'_m(x)) - (L'_u(y) + L'_m(y))) = \kappa(L'_s(y) - 3L'_u(y) - L'_s(x) + 3L'_u(x))$$

$$L'_u(x) + \frac{\kappa L'_s(x) - L'_m(x)}{1 - 3\kappa} = L'_u(y) + \frac{\kappa L'_s(y) - L'_m(y)}{1 - 3\kappa}$$

$$L_u(x) + \frac{hc}{\lambda_u k} \frac{\kappa L'_s(x) - L'_m(x)}{1 - 3\kappa} = L_u(y) + \frac{hc}{\lambda_u k} \frac{\kappa L'_s(y) - L'_m(y)}{1 - 3\kappa}$$

Thus, $$P_u(x)=P_u(y) \qquad \text{Equation (23):}$$

Theorem 2: For any two pixels x and y, if $P_u(x)=P_u(y)$, then $W_u(x)=W_u(y)$ or the color difference of $W_u(x)$ and $W_u(y)$ is neutral. In other words, $$\frac{W_u(x) - W_u(y)}{\sum_{i \in \{r,g,b\}} (W_i(x) - W_i(y))} = \frac{1}{3}$$

Proof: Assume $P_u(x)=P_u(y)$, from equation (14):

$$(1-3\kappa)L'_u(x) + \kappa L'_s(x) - L'_m(x) = (1-3\kappa)L'_u(y) + \kappa L'_s(y) - L'_m(y)$$

$$L'_u(x) - L'_m(x) - L'_u(y) + L'_m(y) = \kappa(L'_s(y) - L'_s(x)) + 3\kappa(L'_u(x) - L'_u(y)) \qquad \text{Equation (24):}$$

Substitute equation (6) into equation (24), and assume $W'_s = \Sigma_{i \in \{r,g,b\}} W'_i$, we have $$(W'_u(x) - W'_u(y)) - (W'_m(x) - W'_m(y)) = \kappa(W'_s(y) - W'_s(x)) + 3\kappa(W'_u(x) - W'_u(y)) \qquad \text{Equation (25):}$$

Sum up every channel $u \in \{r,g,b\}$ in equation (25):

$$(W'_s(x) - W'_s(y)) - 3(W'_m(x) - W'_m(y)) = 0$$

Implying $$(W_s(x)-W_s(y))-3(W_m(x)-W_m(y))=0$$

Thus $W_m(x)-W_m(y)=0$ or $$\frac{W_m(x) - W_m(y)}{W_s(x) - W_s(y)} = \frac{1}{3}$$

where m can be any band.

Theorem 3: For any two pixels x and y, if $w_u(x)=w_u(y)$, then $p_u(x)=p_u(y)$.

Proof: From equations (16) and (6) gives:

$$p_u = \frac{w_u - w_m + \kappa(1 - 3w_u)}{1 - 3w_m} \quad \text{Equation (26)}$$

Thus if $w_u(x)=w_u(y)$ then $p_u(x)=p_u(y)$.

Theorem 4: For any two pixels x and y, if $p_u(x)=p_u(y)$, then $w_u(x)=w_u(y)$ or $w_u(x)$ is linear to $w_u(y)$, that is $w_u(x)=Aw_u(y)+B$, where $$A = \frac{1 - 3w_u(x)}{1 - 3w_u(y)} \text{ and } B = \frac{w_u(x) - w_u(y)}{1 - 3w_u(y)}$$

Proof: Assume $p_u(x)=p_u(y)$, from equation (26):

$$\frac{w_u(x) - w_m(x) + \kappa(1 - 3w_u(x))}{1 - 3w_m(x)} = \quad \text{Equation (27)}$$
$$\frac{w_u(y) - w_m(y) + \kappa(1 - 3w_u(y))}{1 - 3w_m(y)}$$

$w_u(x) - w_m(x) - 3\kappa w_u(x) - 3w_u(y)(w_u(x) + \kappa - 3\kappa w_u(x)) =$
$w_u(y) - w_m(x) - 3\kappa w_u(y) - 3w_u(x)(w_u(y) + \kappa - 3\kappa w_u(y))$ $(1 - 3\kappa)(w_u(x) - w_u(y)) - (1 - 3\kappa)(w_m(x) - w_m(y)) -$
$3(1 - 3\kappa)(w_m(y)w_u(x) - w_m(x)w_u(y)) = 0$ Using $\kappa \neq 1/3$, from equation (27) gives:

$$(w_u(x)-w_u(y))-(w_m(x)-w_m(y))-3(w_m(y)w_u(x)-w_m(x)w_u(y))=0$$

For chromaticity pixels, $w \neq 1/3$. Thus, $w_u(x)=Aw_u(y)+B$, where $$A = \frac{1 - 3w_u(x)}{1 - 3w_u(y)} \text{ and } B = \frac{w_u(x) - w_u(y)}{1 - 3w_u(y)}$$

The invention claimed is:

1. A method performed by a computing device for determining a shadow invariant image from input image data, the method comprising:
   receiving input image data associated with an image of a scene from an image recording device, each pixel of the input image data including pixel intensities associated with three or more primary colors;
   calculating a shadow invariant intensity for each pixel intensity of each pixel; and
   displaying a color shadow invariant image of the scene by displaying the shadow invariant intensities of each pixel on a display device.

2. The method of claim 1 wherein receiving input image data further comprises uploading data from the image recording device to the computing device.

3. The method of claim 1 wherein calculating the shadow invariant intensity for each pixel intensity further comprises computing:

$$P_u = L_u + \frac{\kappa \sum_{i \in \{r,g,b\}} \frac{\lambda_i}{\lambda_u} L_i - \frac{\lambda_m}{\lambda_u} L_m}{1 - 3\kappa}$$

where $L_u$ is the logarithm of the pixel intensity $I_u$;
$\kappa$ is a constant other than $1/3$; and
$\lambda_u$ is a wavelength of the primary color u.

4. The method of claim 3 wherein calculating the shadow invariant intensity for each pixel intensity further comprises computing:

$$L_u = \log(I_u) = \log\left[(\rho_d S(\lambda_u) + \rho_s) q_u \frac{2hc^2}{\lambda_u^5}\right] + \left(-\frac{hc}{\lambda_u kT}\right)$$

where $I_u$ is a pixel intensity associated with primary color u;
h is Plank's constant;
c is the speed of light in a vacuum;
k is Boltzmann's constant;
T is the color temperature
$\rho_d$ and $\rho_s$ are geometric factors associated with diffuse and specular reflection of each pixel;
$q_u$ is the magnitude of the sensor response associated with the pixel; and
$S(\lambda)$ is a surface reflectance spectrum.

5. The method of claim 1 further comprises calibrating the image recording device.

6. The method of claim 5 wherein calibrating the image recording device further comprises calculating the relative wavelength $$\lambda_u' = \frac{1/(L_u(x) - L_u(y))}{\sum_{i \in \{r,g,b\}} 1/(L_i(x) - L_i(y))}$$

for each shadow and non-shadow pixel pair x and y, respectively, within a uniform color distribution.

7. The method of claim 1 wherein the image recording device further comprises a digital camera, a mobile phone, a camera phone, a personal digital assistant, a camcorder or any device that digitally captures images via an electronic image sensor and can store the image data in memory.

8. The method of claim 1 wherein the computing device further comprises a desktop computer, a laptop computer, a portable computer, a display system, a television, a computer monitor, a navigation system, a portable media player, a personal digital assistant, a game console, a handheld electronic device, an embedded electronic device, or an appliance.

9. The method of claim 1 wherein calculating the shadow invariant image further comprises assuming Plankian illuminating conditions.

10. A method performed by a computing device for determining a shadow-shading invariant image from input image data, the method comprising:

receiving input image data associated with an image of a scene from a image recording device, each pixel of the input image data including pixel intensities associated with three or more primary colors;

calculating a shadow-shading invariant intensity for each pixel intensity of each pixel; and displaying a color shadow-shading invariant image of the scene by displaying the shadow-shading invariant intensities of each pixel on a display device.

11. The method of claim 10 wherein receiving input image data further comprises uploading data from the image recording device to the computing device.

12. The method of claim 10 wherein calculating the shadow-shading invariant intensity for each pixel intensity further comprises calculating:

$$p_u = \frac{L_u - \frac{\lambda_m}{\lambda_u}L_m + \kappa\left(\sum_{i \in \{r,g,b\}}\left(\frac{\lambda_i}{\lambda_u}L_i\right) - 3L_u\right)}{\sum_{i \in \{r,g,b\}}\left(\frac{\lambda_i}{\lambda_u}L_i\right) - \frac{3\lambda_m}{\lambda_u}L_m}$$

where $L_u$ is the logarithm of the pixel intensity $I_u$;

$\kappa$ is a constant other than $\frac{1}{3}$; and $\lambda_u$ is a wavelength of the primary color u.

13. The method of claim 12 wherein calculating the shadow-shading invariant intensity for each pixel intensity further comprises calculating:

$$L_u = \log(I_u) = \log\left[(\rho_d S(\lambda_u) + \rho_s)q_u \frac{2hc^2}{\lambda_u^5}\right] + \left(-\frac{hc}{\lambda_u kT}\right)$$

where $I_u$ is a pixel intensity associated with primary color u;

h is Plank's constant;

c is the speed of light in a vacuum;

k is Boltzmann's constant;

T is the color temperature $\rho_d$ and $\rho_s$ are geometric factors associated with diffuse and specular reflection of each pixel;

$q_u$ is the magnitude of the sensor response associated with the pixel; and $S(\lambda)$ is a surface reflectance spectrum.

14. The method of claim 10 further comprises calibrating the image recording device.

15. The method of claim 14 wherein calibrating the image recording device further comprises calculating the relative wavelength $$\lambda'_u = \frac{1/(L_u(x) - L_u(y))}{\sum_{i \in \{r,g,b\}} 1/(L_i(x) - L_i(y))}$$

for each shadow and non-shadow pixel pair x and y, respectively, within a uniform color distribution.

16. The method of claim 10 wherein the image recording device further comprises a digital camera, a mobile phone, a camera phone, a personal digital assistant, a camcorder or any device that digitally captures images via an electronic image sensor and can store the image data in memory.

17. The method of claim 10 wherein the computing device further comprises a desktop computer, a laptop computer, a portable computer, a display system, a television, a computer monitor, a navigation system, a portable media player, a personal digital assistant, a game console, a handheld electronic device, an embedded electronic device, or an appliance.

18. The method of claim 10 wherein calculating the shadow-shading invariant image further comprises assuming Plankian illuminating conditions.

* * * * *